United States Patent [19]

Ishman et al.

[11] 4,388,644
[45] * Jun. 14, 1983

[54] APPARATUS FOR MONITORING A MULTICHANNEL RECEIVER

[75] Inventors: Neal H. Ishman, Springfield; Robert B. Buxton, Burke; Duane A. Durst, Sterling; James F. McArthur; Michael E. Johnson, both of Falls Church, all of Va.

[73] Assignee: E-Systems, Inc., Dallas, Tex.

[*] Notice: The portion of the term of this patent subsequent to Aug. 5, 1997, has been disclaimed.

[21] Appl. No.: 120,927

[22] Filed: Feb. 12, 1980

Related U.S. Application Data

[63] Continuation of Ser. No. 733,164, Oct. 18, 1976, Pat. No. 4,216,497.

[51] Int. Cl.³ .......................... H04N 7/00; H04B 1/00
[52] U.S. Cl. ........................................ 358/84; 455/2
[58] Field of Search ............................. 358/84; 455/2

[56] References Cited

U.S. PATENT DOCUMENTS

| | | | |
|---|---|---|---|
| 2,892,885 | 6/1959 | Freeman | 358/84 |
| 2,935,557 | 5/1960 | Bushman | 455/2 |
| 2,957,046 | 10/1960 | Freeman et al. | 179/2 |
| 3,058,065 | 10/1962 | Freeman et al. | 325/31 |
| 3,093,795 | 6/1963 | Jones | 325/31 |
| 3,172,948 | 3/1965 | Rubinstein | 358/84 |
| 3,188,384 | 6/1965 | Townsend | 358/84 |
| 3,230,302 | 1/1966 | Bruck et al. | 358/84 |
| 3,514,530 | 5/1970 | Simons | 358/84 |
| 3,586,771 | 6/1971 | Hamburger | 358/84 |
| 3,676,580 | 7/1972 | Beck | 358/84 |
| 3,703,684 | 11/1972 | McVoy | 358/84 |
| 3,733,430 | 5/1973 | Thompson | 358/84 |
| 3,790,700 | 2/1974 | Callais et al. | 358/84 |
| 3,800,223 | 3/1974 | Mead | 325/31 |
| 3,803,349 | 4/1974 | Watanabe | 455/2 |
| 3,878,322 | 4/1975 | Sullivan | 358/84 |
| 3,947,624 | 3/1976 | Miyake | 358/84 |
| 3,987,397 | 10/1976 | Belcher et al. | 455/2 |
| 4,025,851 | 5/1977 | Haselwood et al. | 455/2 |
| 4,044,376 | 8/1977 | Porter | 358/84 |
| 4,048,562 | 9/1977 | Haselwood et al. | 455/2 |
| 4,058,829 | 11/1977 | Thompson | 358/84 |
| 4,216,497 | 8/1980 | Ishman et al. | 358/84 |

OTHER PUBLICATIONS

Davis et al., "Long-Term Continental U.S. Timing System via Television Networks," *IEEE Spectrum*, Aug. 1971, pp. 41-52.

Breeze, "Television Line 21 Encoded Information and its Impact on Receiver Design," *IEEE Trans. Broadcast Television Receivers*, vol. BTR-18, No. 4, Nov. 1972, pp. 234-237.

*Primary Examiner*—John C. Martin
*Attorney, Agent, or Firm*—L. Lawton Rogers, III

[57] ABSTRACT

A system for monitoring the operation of a multichannel receiver includes a channel monitor coupled to the sync separator of the receiver for collecting and transmitting channel information to a central collector station. The collector station selectively responds to one of a plurality of channel monitors to record, in sequential order, channel information. Each of the channel monitors is similar and includes a synchronizing pulse generator triggered by the vertical synchronizing pulse from a receiver to generate a match recognize pulse when a frequency coupled to the receiver from the monitor and the channel frequency have a preestablished relationship. To generate the match recognize pulse a counter provides signals to a tuning matrix that controls a frequency synthesizer or plurality of oscillators for generating the frequency coupled to the receiver for the match evaluation. Also, the counter activates a data encoder that provides channel information to the collector station. The collector station responds to the channel information and records incoming data for future evaluation of the operation of the multichannel receiver.

31 Claims, 16 Drawing Figures

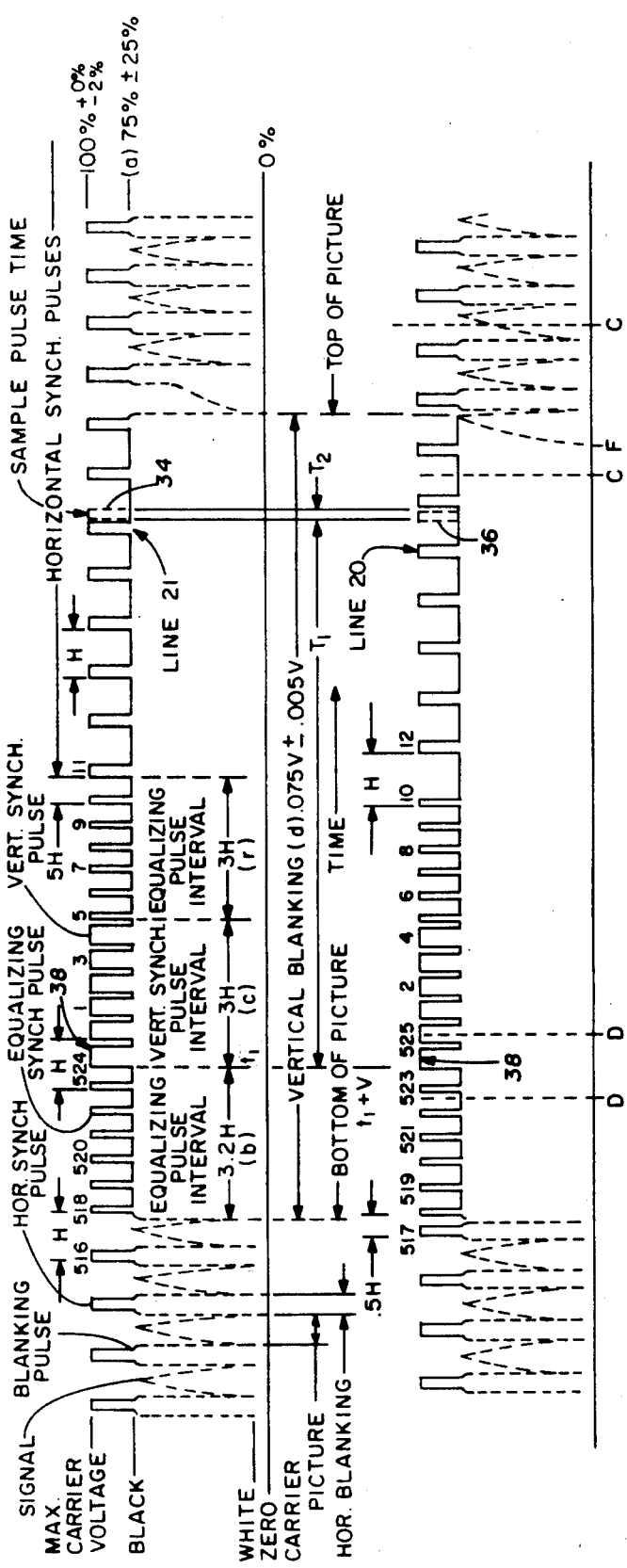
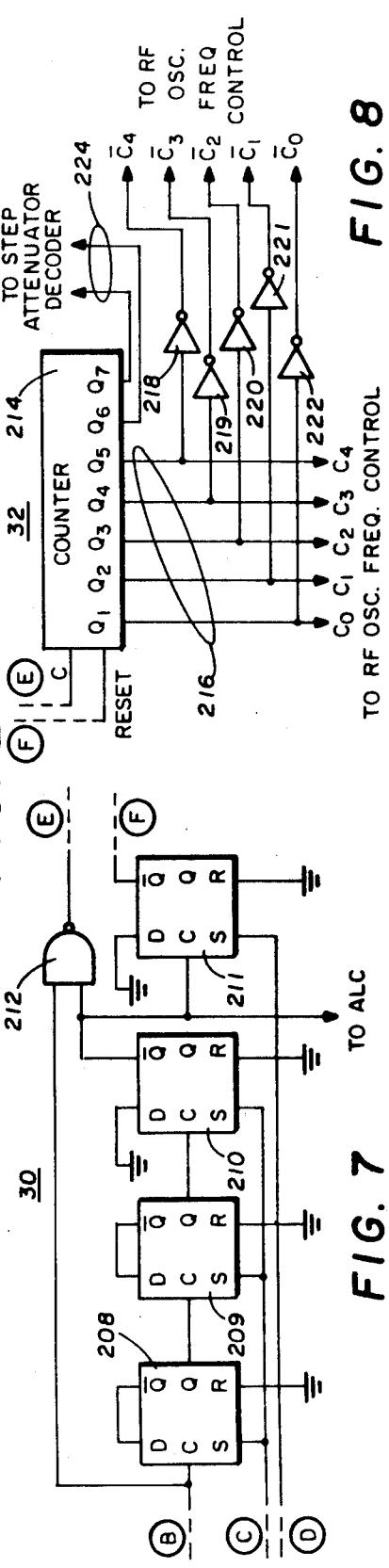
FIG. 2
FIG. 7
FIG. 8

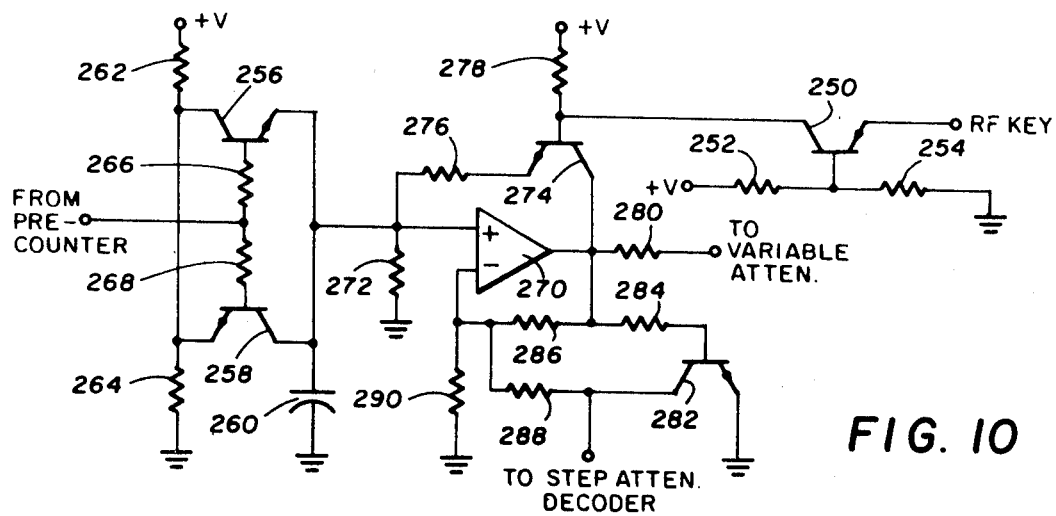
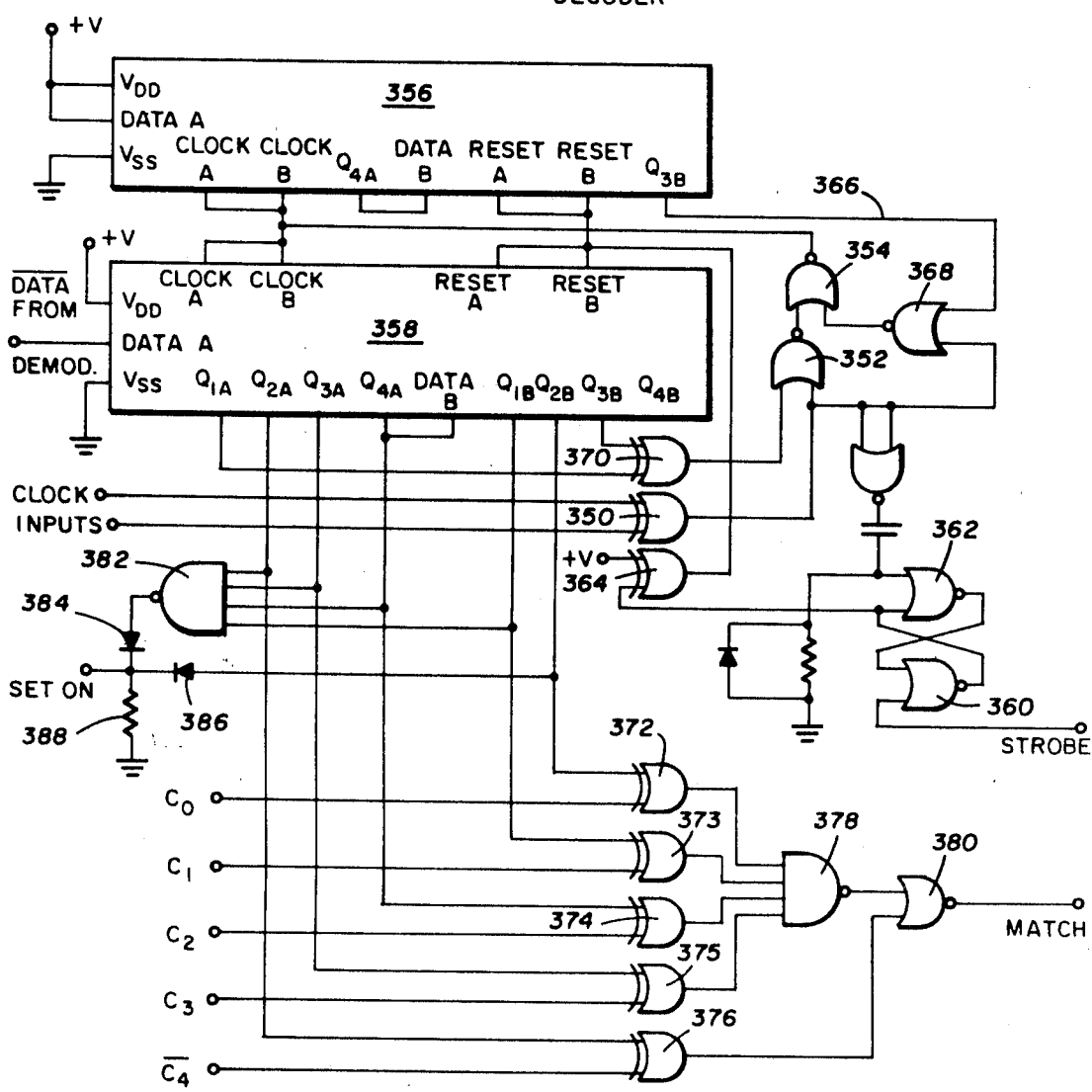
FIG. 10
FIG. 13

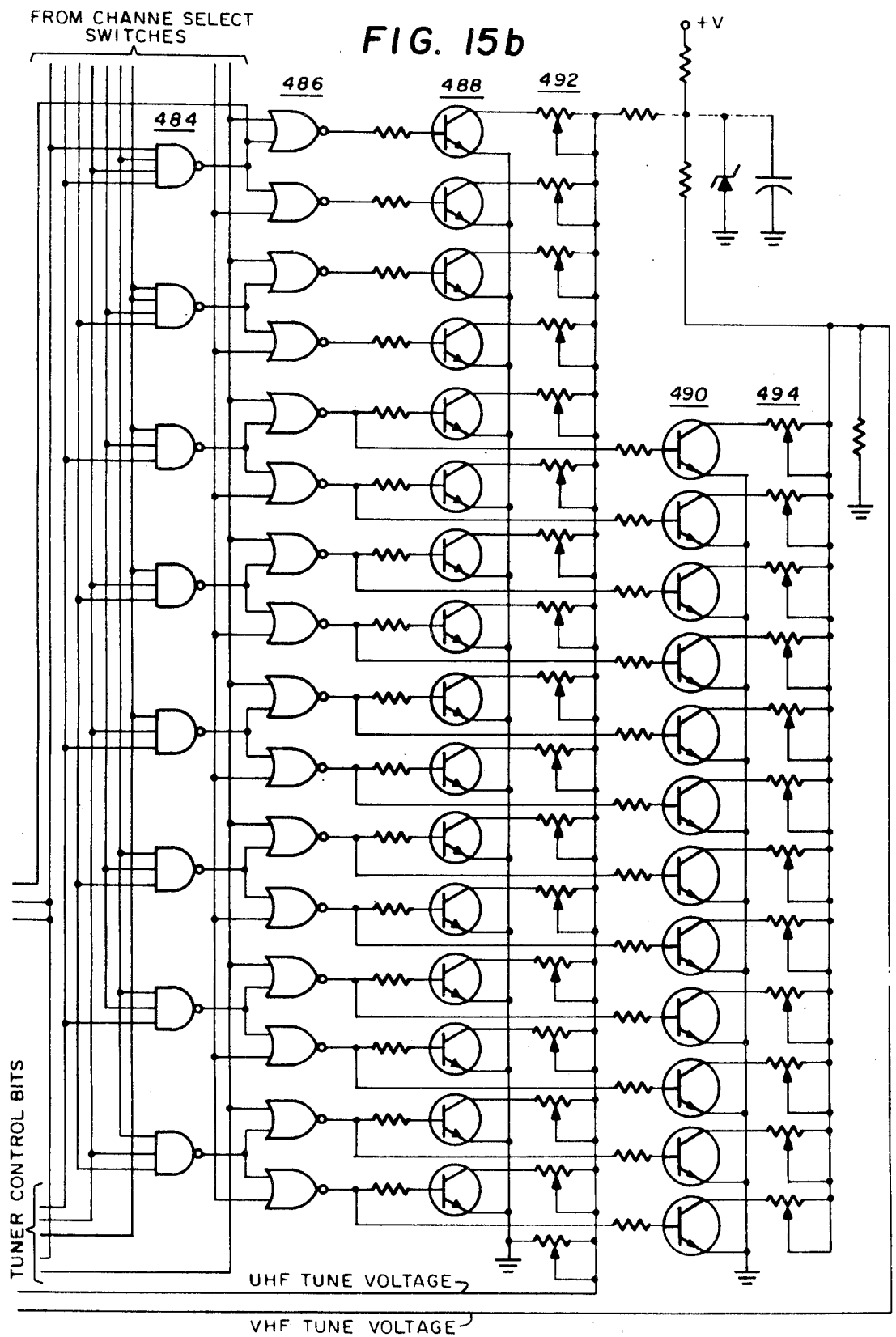

APPARATUS FOR MONITORING A MULTICHANNEL RECEIVER

This application is a continuation of application Ser. No. 733,164, filed Oct. 18, 1976, for "Apparatus for Monitoring a Multichannel Receiver", now U.S. Pat. No. 4,216,497.

This invention relates to a channel survey system, and more particularly to a monitor for surveying the operation of a multichannel receiver.

Although primarily directed to apparatus for performing audience surveys of television broadcast program selections at receivers, the invention also finds utility in monitoring the operation of any multichannel receiver for determining whether the receiver is turned on or off, and if so, the channel to which the receiver is tuned, and the length of time the receiver is tuned to the particular channel. It has long been recognized that there is significant information available from data relating to the operation of a multichannel receiver. This information is of interest to program producers to evaluate the public's interest in a particular program. Advertisers are also interested in such information as a means for evaluating the effect of sponsoring a program available to viewers on a particular channel. Governmental agencies are interested in channel operation information to evaluate the need for additional channels, and for policing the operation of presently existing channels.

Some of the early techniques for evaluating channel selection of a multichannel receiver simply relied on a surveyor making personal contact with the person operating the receiver, and inquiring as to the channel operation. Such evaluations often produced inaccurate information because of the questioning techniques and the answers provided by those surveyed, particularly where the person surveyed was annoyed by the questioning technique. To avoid this source of error, surveys were then made of selected receivers where previous contact had been made with potential operators for permission to occasionally conduct a survey. Although in most cases the inaccuracies produced by the survey as a result of the person interviewed being annoyed by the interruption were minimized by this approach, there was the possibility of biased results due to the constant awareness by the person operating a receiver that a survey may be conducted.

To avoid disturbing a viewer of a television receiver or an operator of a multichannel receiver, monitoring equipment was later developed which connected directly to the receiver and automatically monitored the operation thereof. Although advance arrangements were required to connect the monitor equipment to the receiver, the existence of such a monitor was often forgotten so the channel selection was made independent of the survey equipment. The use of such monitors significantly improved the accuracy of a survey, and more importantly provided continuous monitoring of receiver operations not on a periodic or randomly sampled basis.

Monitoring equipment on each receiver is usually connected by a special signal channel, customarily a telephone line, or by radio transmission, to a central data processing station. The central station interrogates the monitor attached to the receiver to, first, determine whether or not the receiver is turned on, and, second, if on, to what channel the tuner is set. This interrogation is accomplished without disturbing a receiver operator, and without the knowledge of the interrogation.

While receiver monitoring equipment has eliminated many of the objectionable features of polls made by telephone or personal visits, it has been found that significant errors arise as a result of the nature of the system attached to the receiver which transmits the survey information to the central station.

Many of these errors have arisen in prior art systems because of the critical placement requirements of the receiver monitor, particularly where the survey information was transmitted by radio signals. In accordance with the present invention, the receiver monitor and the collecting station are located within the same building enclosure and utilize existing wiring for transmission of survey information. This eliminates the need for an antenna at the monitoring equipment and also at the collecting station. Further, by utilizing existing wiring the critical placement of the monitor with respect to the collecting station is eliminated.

Another source of significant error in prior art survey collection systems resulted from the transmission of analog data between the receiver monitor and the collecting station. When analog signals are transmitted over a hard wired channel extraneous noise signals distort the analog data of the survey information. In accordance with the present invention, the receiver monitor provides digital data words that are transmitted via radio frequency, optical, hard wire or over existing wiring paths to a collecting station that responds to the digital data words for recording channel usage. This minimizes errors in the collecting station due to noise or other signal variations existing in the transmission path.

In some prior art apparatus when the monitor was connected to the receiver the condition of the receiver, such as IF alignment, adversely affected the operation of the monitor. This on occasion produced survey information errors particularly from vertical sync coincidence if the vertical sync pulses from two or more stations occur at the same time. The system of the present invention is essentially independent of receiver condition and provides accurate survey information by eliminating errors due to vertical sync coincidence. The monitor of the present invention accurately identifies channels of the receiver even if the receiver is tuned to a channel not carrying an information signal.

A significant objection to many prior art monitoring systems was the complicated installation requirements of the receiver monitor. Special wiring was required in many installations resulting in complicated installation procedures, and, in addition, significantly added to the expense of the total system. These complications were also the result of special connection requirements to existing telephone lines or the installation of transmitting antennas and the connection of such antennas to the receiver monitor. In accordance with the present invention, installation may be made by connecting a coupler of the monitor to existing terminal connections of the receiver. An alternative technique for accomplishing this is to provide an RF switch that momentarily disconnects the external antenna and connects the receiver input to the test oscillator. This approach, however, suffers from the fact that signal level to the receiver is decreased by the insertion loss of the RF switch which in turn may influence the viewing habits of the people watching the set.

A communications link is required between the television monitor and the household collector. Although communications through the power line is the technique that was actually implemented in demonstrating this technique, it is not the only possibility. Hard wire, RF and fiber optics, for example, are other possible ways of realizing this communications link since reliable transmission of digital data over short distances involved is fairly standard. This transmission is complicated by the fact that there may be as many as four TV sets in the household that must be monitored by the system. In this embodiment, a FDM (frequency division multiplex) technique transmitted over the power line was used for the simultaneous communications systems. Other fairly well known techniques for accomplishing similar separation was TDM (time division multiplexing) and physical separation (separate wires from each TV monitor).

The monitor is then simply plugged into an existing wiring circuit thereby maintaining portability of the receiver and the monitoring equipment. In addition, the collecting station is also portable and simply plugged into the same existing wiring as the monitor. Thus, there is no special hard wiring between the receiver and the receiver monitor, and further no special wiring between the monitor and the collecting station. Typically, the power line to the receiver is utilized as the transmission path, although radio frequency and hard wiring are alternate approaches for the transmission path.

In accordance with the present invention, a system for monitoring the operation of a multichannel receiver, where each channel is identified by a preestablished frequency, includes a detector responsive to a frequency pulse from the receiver to identify a match between a channel preestablished frequency and a frequency signal injected into the receiver. Upon the identification by the detector of a match, a match signal is generated to a counter that responds thereto and maintains a count signal related to the channel preestablished frequency. A tuning matrix also responds to the counter output signals to generate control signals to oscillators that respond thereto to sequentially generate preestablished frequency signals identified with each channel. These frequency signals are injected into the receiver for match identification.

In accordance with the invention, the system for monitoring the operation of a multichannel receiver, where each channel is identified by a preestablished frequency, includes a monitor responsive to a frequency pulse from the receiver for generating channel identifying data when a match occurs between a channel preestablished frequency and a frequency injected into the receiver. This channel identifying data is transmitted to a remote recorder at a collecting station that generates a channel identifying code for recording in memory storage.

In an alternate embodiment of the invention, the system for monitoring the operation of the multichannel receiver, where each channel is identified by a signal from a channel tuner, includes a channel switch for selecting one of the channels of the receiver by generating a tuning signal. A tuning matrix responds to the tuning signal and generates a channel number signal to a channel tuner. The tuning signal is also converted into channel identifying data for transmission to a remote recorder at a collecting station. The remote recorder receives channel identifying data from a plurality of the receivers and includes means for selecting the channel identifying data from one of the receivers for recording in memory storage.

A more complete understanding of the invention and its advantages will be apparent from the specification and claims and from the accompanying drawings illustrative of the invention.

Referring to the drawings:

FIG. 2 is a waveform of a video input signal to the television receiver of FIG. 1 showing a sync interface timing diagram for illustrating the injection of a frequency into a receiver for channel monitoring;

FIG. 7 is a logic diagram of the precounter of the receiver monitor of FIG. 1;

FIG. 8 is a logic diagram of the seven stage counter of FIG. 1;

FIG. 10 is a schematic diagram of the RF level control for continuously controlling or fine adjustment of the level of frequency signal injected into the receiver of FIG. 1;

FIG. 13 is a logic schematic of the shift register, digital comparator, and "01" recognizer of the collecting station;

FIGS. 15a and 15b are schematic diagrams of the tuning matrix of the alternate embodiment of the receiver monitor of FIG. 14.

Figure 1:
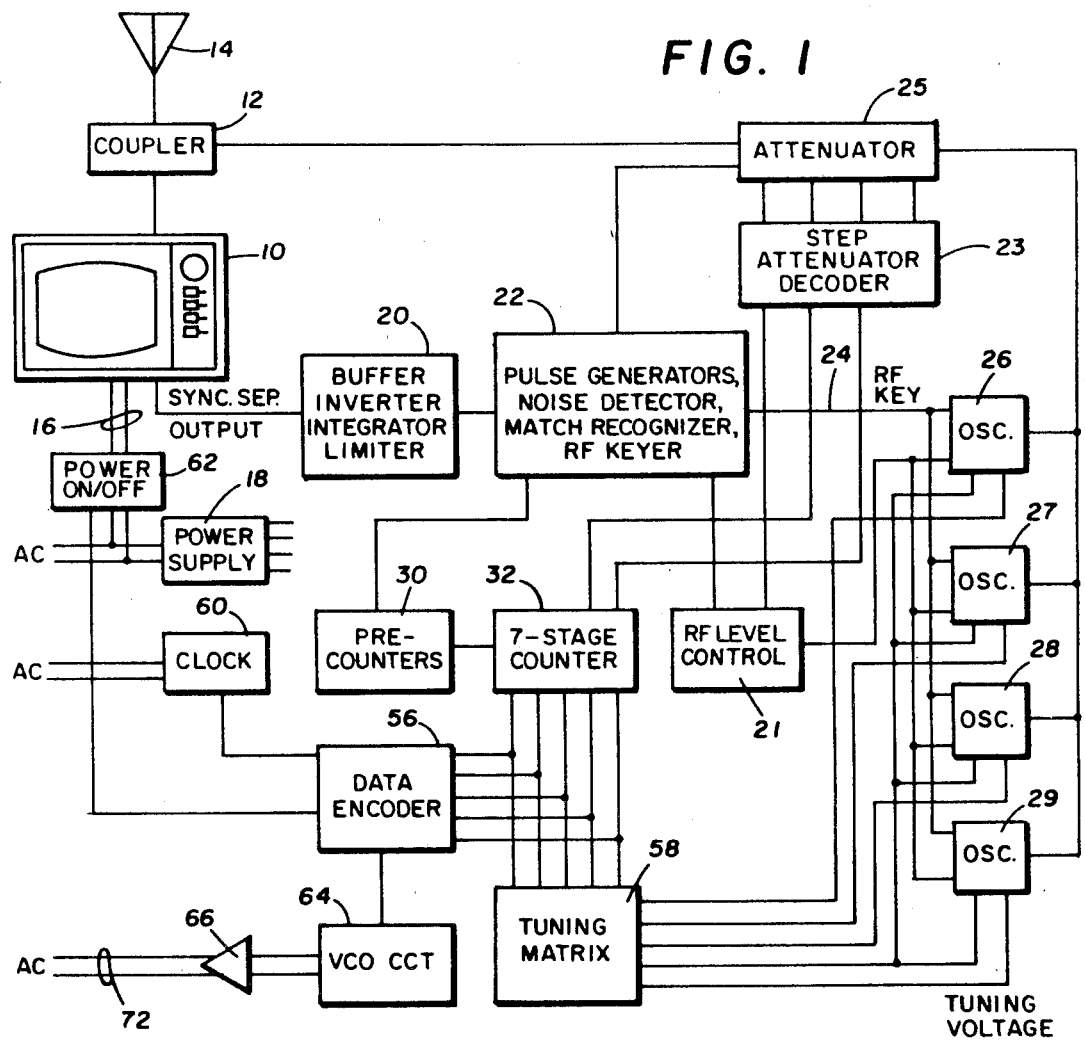
FIG. 1 is a block diagram of a receiver monitor connected to a television receiver having multiple channel selections.

Referring to FIG. 1, there is shown a block diagram of a multichannel receiver monitor wherein a frequency pulse is injected into the antenna line of a multichannel receiver 10 by means of a coupler 12. While illustrated and identified as a television receiver, it will be understood that the multichannel receiver 10 may comprise any receiving equipment that is tunable to one of a multitude of channels where each channel is identified by a preestablished frequency. With respect to a television receiver, video and audio signals are applied to an input of the receiver by means of an antenna 14. AC power is supplied to the receiver 10 over power lines 16 that also connect to a power supply 18 that provides the various voltage levels to circuit components of the receiver monitor.

A frequency pulse signal injected by means of the coupler 12 into the receiver 10 is monitored by a line connection from the sync separator output of the receiver to an amplifier 20. Initially, the signal from the sync separator is applied to a manual gain control for adjustment of the signal level. Each receiver has its own component tolerance variations and the variations in the amplitude of the sync separator signal are compensated for by a manual adjustment in the amplifier 20. The manually adjusted sync separator signal is then applied to a buffer in the amplifier 20 that produces one output in phase with the input and a second output 180 degrees phase displaced. This allows for the monitoring of a receiver 10 whether producing a sync separator output of either a positive or negative polarity. An integration is then made in the amplifier 20 to eliminate any horizontal synchronizing pulses that may appear with the sync separator output. Finally, after amplification in the amplifier 20 the input is coupled to a limiter network to produce a clean output pulse.

Following the amplifier 20, the output pulse is applied to a controller 22 for further processing to other components of the receiver monitor. Initially the pulse output from the amplifier 20 is applied to a synchronizing pulse generator which is triggered by the trailing edge of the sync separator pulse. When this pulse generator turns off, it triggers a second pulse generator which produces an RF key signal lasting for a time $T_2$ on FIG. 2 on a line 24 to a bank of oscillators 26–29. The RF key signal on the line 24 controls the operation of the RF oscillators 26–29. The RF signal level from the oscillators 26–29 is controlled from the controller 22 by means of an RF level control 21, as will be explained.

Referring to FIG. 2, there is diagrammatically shown the injected frequency pulse timing relationship in a video signal input to the receiver 10. This diagram shows various pulses transmitted to a television receiver for horizontal and vertical synchronization including equalizing synchronization. Injected between horizontal synchronizing pulses is an RF frequency from one of the oscillators 26–29 as indicated by the pulse 34 for the even field and the pulse 36 for the odd field. These pulses can be injected into the receiver 10 without overlapping the synchronizing pulses in either the even or the odd fields. The vertical synchronizing pulses in the even and odd fields are applied to the amplifier 20 and the vertical synchronizing field starts the time period $T_1$ and it is this time interval, controlled by the first pulse generator of the controller 22, that determines when the second pulse generator turns on. The time duration of the injected pulse is controlled by the second pulse generator of the controller 22 and is indicated in FIG. 2 by the time period $T_2$.

Also included as part of the controller 22 is a noise detector that prevents the transmission of a pulse if the receiver is tuned to an unoccupied channel. Other methods of producing the same results without inhibiting transmission are possible. For example, the RF signal repetition time of the oscillators 26, 27, 28 and 29 is synchronized to approximately 60 Hz by using the AC power line as a reference when the noise detector is activated.

The controller 22 also includes a match recognizer gate that responds to the reception of the frequency injected pulse by the receiver 10 to recognize a match between the channel frequency and the injected frequency. To identify a particular channel by a match condition, the controller 22 includes a level control circuit that sequentially increases the amplitude of the frequency pulse injected into the receiver 10 by generating control signals through a step attenuator decoder 23 to an attenuator 25, which along with the match recognizer, will be further described.

Whenever a match condition exists between the frequency injected signal and the channel preestablished frequency, a counter signal is input to a precounter 30 that controls a seven stage counter 32. The precounter 30 tracks the overall match status and controls the seven stage counter. Upon the reception of a match indication by the precounter 30, the precounter is reset to zero. Subsequently, each time a frequency signal is injected into the receiver 10, and a mismatch is indicated at the precounter 30 the precounter advances one count. If the precounter does not reach a count of four before a match condition is indicated, which in this case is when the oscillator is injecting at the tuned frequency, no control is exercised over the seven stage counter 32. However, if four consecutive pulses indicate a mismatch the precounter reaches a count of four and resets the seven stage counter 32 to zero. As will be explained, after circuitry of the precounter 30 generates one reset pulse it cannot generate another without first being reset by a match signal from the controller 22.

So long as frequency pulse signals are injected into the receiver 10, and a mismatch is indicated, each mismatch pulse from the controller 22 advances the seven stage counter 32 one count position, that is, advancing the total count in the counter 32 to represent the next highest channel of the receiver 10. The first match pulse received by the precounter 30 resets it to zero thereby preventing a further count advance in the seven stage counter 32.

Figure 3:
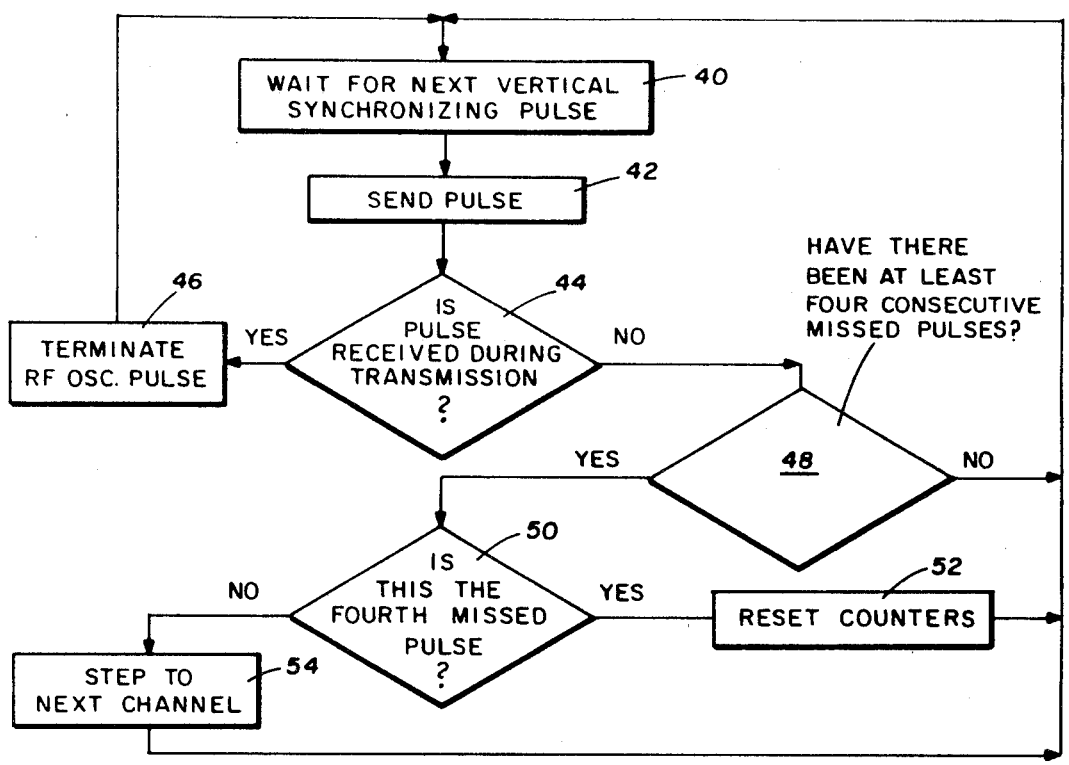
FIG. 3 is a flow diagram illustrating the sequence of operation of the receiver monitor of FIG. 1.

Referring to FIG. 3, the operation of the monitor for control of the seven stage counter 32 from a sync separator pulse is illustrated by way of a flow diagram wherein the process for controlling the counter 32 starts when the next sync separator pulse is received by the controller 22 as indicated by the processing step 40. The controller 22 then generates the RF key signals to the oscillators 26–29 and injects a sample pulse into the receiver 10 during a processing step 42. This injected pulse is received by the controller 22 indicating a match recognition, that is, the frequency of the injected pulse matches the frequency of the tuned channel of the receiver 10. Next, an inquiry step 44 advances the counter control process to terminate the injected pulse during a step 46. Since a match has been made between the injected frequency and the frequency of the tuned channel of the receiver 10, the controller 22 returns to a standby condition to wait for the next sync separator pulse.

If a mismatch condition occurs between the injected frequency and the channel frequency, inquiry 44 advances the sequence through a negative line to an evaluation of how many consecutive pulses have been generated that produce a mismatch condition. This is inquiry 48 and is a function of the precounter 30. When less than four consecutive mismatch conditions exist, the sequence returns the controller 22 to the ready condition to accept the next sync separator pulse. When a match condition exists and four consecutive mismatch pulses are generated by the controller 22, the operation of the precounter 30 and the seven stage counter 32 functions to perform the inquiry 50 which resets the counter 32 through a step 52 when four consecutive mismatch pulses have been generated. If the pulse evaluated is not the fourth missed pulse, the counter 32 is stepped one channel and the controller 22 returns to a ready condition for the next sync separator pulse. The counter 32 is advanced one channel during the step 54 until a matched condition exists between the injected frequency and the frequency of the tuned channel of the receiver 10.

Referring again to FIG. 1, count data related to a channel number as generated in the seven stage counter 32 is input to a data encoder 56 and a tuning matrix 58. The tuning matrix converts the digital data from the counter 32 into an analog voltage representing a tuning voltage to control the voltage controlled oscillators 26–29. If a synthesizer or individual oscillators are used, this digital-to-analog converter would not be required. As illustrated, the monitor includes four oscillators 26–29 with one of the four oscillators selected by the voltage from the tuning matrix depending on the frequency of the channels being scanned. It will be understood, however, that a multiple oscillator may be employed instead of the oscillators 26–29 and also a frequency synthesizer may be incorporated into the system for generation of the RF frequency pulse injected into the receiver.

In addition to the seven stage counter 32, the data encoder 56 also connects to a clock 60 and a "power on" detector 62. The clock 60 is a conventional circuit producing a pulse each time the AC power line voltage passes through the zero level. Thus, the pulse rate output of the clock 60 has a frequency of 120 Hz which is the timing signal applied to the data encoder 56. The "power on" detector is a circuit that responds to power applied to the receiver 10 and typically may be a relay generating a contact closure signal to the data encoder 56.

When power is applied to the receiver 10, as indicated by the "power on" detector 62, the data encoder 56 generates data at a rate determined by the output of the clock generator 60. Data transmitted by the data encoder 56 is related to the count level in the seven stage counter 32. When the receiver 10 is off the "power on" detector 52 overrides the data in the counter 32 changing it to binary code 00001, which indicates that the receiver 10 is off. If the noise detector of the controller 22 indicates that the receiver 10 is tuned to an unoccupied channel, the encoder 56 is prevented from sending data.

Data generated by the encoder 56 is a series of digital voltage pulses applied to a voltage controlled oscillator and carrier current transmitter 64. The voltage controlled oscillator 64 produces an FSK or frequency varying with the digital level of the data transmitted serially from the data encoder 56. The output of this oscillator is applied to an amplifier 66 and transmitted over the AC power line 72 coupled to the receiver 10 and to a collecting station. The center frequency of this VCO signal transmitted over the power line is used to isolate transmissions from multiple receiver monitor equipments of FIG. 1.

Figure 4:
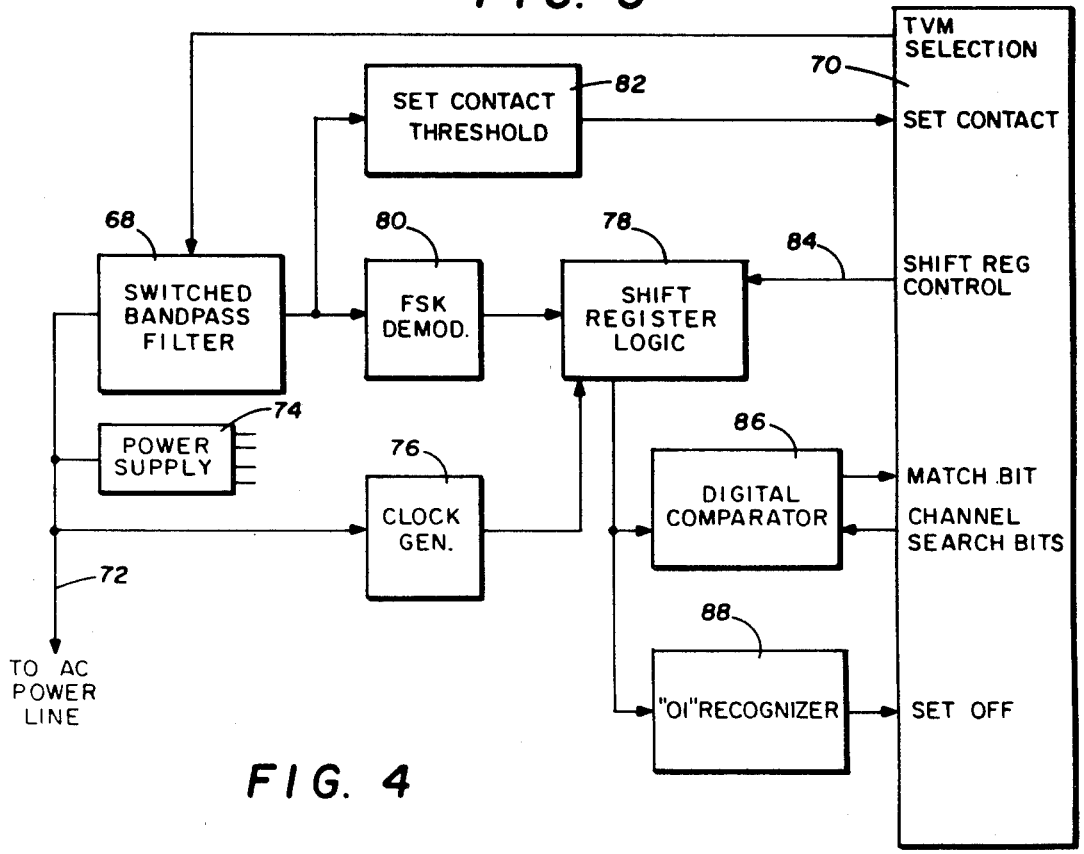
FIG. 4 is a block diagram of a collecting station responding to channel identifying data from the receiver monitor for storing data relating to the monitored operation of a plurality of multichannel receivers.

Referring to FIG. 4, there is shown a collecting station that may service up to four multichannel receiver monitors of the type illustrated in FIG. 1 wherein the frequency signal from each voltage controlled oscillator 64 is transmitted over the AC power line to a switched bandpass filter 68.

The switched bandpass filter 68 responds to control signals from an operations controller 70 that sequentially tunes the filter to one of four receiver signals applied to the power line 72.

Also coupled to the power line 72 is a power supply 74 and a clock generator 76. These two elements do not respond to the receiver monitor signal, but rather are energized by the power voltage on the line 72.

The power supply 74 is a conventional circuit providing voltage to the individual components of the collector system. The clock generator is similar to the clock generator 60 of FIG. 1 responding to the zero line crossing of the energizing voltage to produce timing signals to shift register logic 78 at the rate of 120 Hz.

The receiver monitor signal from the switched bandpass filter 68 is output to a demodulator 80 and a contact threshold detector 82. The demodulator 80 converts the receiver monitor signal into a digital format that is then filtered and processed through the shift register 78. The contact threshold detector 82 responds to the level of the FSK signal to determine whether a usable signal is present in the bandpass filter 68 for processing by the operations controller 70.

The digital signal applied to the shift register logic 78 from the demodulator 80 is processed to determine what binary code has been transmitted by the selected receiver 10. The shift register logic 78 performs this operation in response to a shift register control signal on a line 84 that is generated by the operation controller 70 when the bandpass filter is set to a selected receiver. The shift register control signal on the line 84 also disconnects the clock signals from the shift register logic 78.

After sufficient time has elapsed to establish the correct incoming digital state to the shift register logic 78, the register starts clocking the incoming data from the demodulator 80. Seven bits of information are clocked into the register logic 78 and an evaluation of the data is then made. The data, however, must be monitored until it is determined that the five information bits are properly aligned. This is achieved by monitoring the first and seventh bits into the shift register until they are found to be of an opposite logic state, at which time the second through sixth output bits will correspond to the five bit word representing a channel of the receiver 10. When it has been established that a word has been clocked into the register logic 78, the clock generator 76 is disconnected from the logic thereby stopping the clocking operation and the five bit data word is ready for processing.

This five bit data word from the shift register logic 78 is applied to a digital comparator 86 and an "01" recognizer 88. Also applied to the digital comparator 86 are channel search bits from the operations controller 70 that are compared with the data from the shift register logic 78. In the digital comparator, the word shifted from the shift register logic 78 and the search bits from the operation controller 70 are compared, and when the two words present a matched condition a match bit is generated to the operations controller 70. When a matched condition exists and a match bit is input to the operations controller 70 the last search word from the operations controller is recognized as the channel received by the receiver 10. This word is then stored in the operations controller 70 for additional processing.

Data from the shift register logic 78 is also applied to the recognizer 88 to be utilized to determine whether the received five bit word is the code 00001 which, as mentioned previously, is an indication that the receiver 10 is turned off. When this condition is identified this recognizer generates the receiver off signal that is stored by the operational controller 70.

The collector station continues to monitor each of the receiver monitors that provide channel signals on the line 72 to the switched bandpass filter 68. Each time a new channel number is identified with a receiver, a channel identification word is stored in the operations controller 70. From this stored information data may be generated indicating what channels are tuned to at the various receivers and the length of time each channel is tuned to a particular receiver. This data may be recovered in several ways. A modem interconnecting with the telephone system allowing recall of data at any time desired is one possibility. A central system can then call the phone installed in the home and retrieve the stored data from controller 70. A second approach is to record the digital data on a magnetic tape cartridge. This provides a longer term storage and the data from tape cassettes or cartridges can be retrieved and reduced to again provide TV viewing statistical information.

Figure 5:
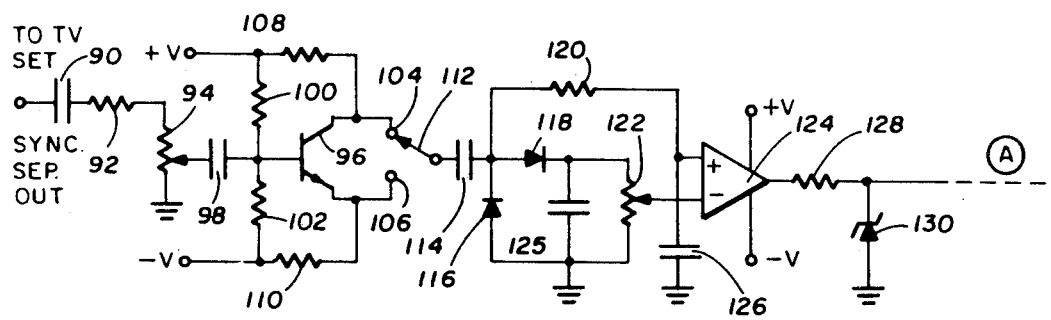
FIG. 5 is a schematic diagram of the buffer, inverter, integrator and limiter of the receiver monitor.

Referring to FIG. 5, there is shown a schematic diagram of the buffer amplifier 20 wherein the sync separator signal is applied through a coupling capacitor 90 to a manual level adjustment including a resistor 92 in series with the potentiometer 94, the latter connected to ground. As explained, the manual level adjustment, by means of the potentiometer 94, provides an adjustment of the amplitude of the sync separator signal applied to the amplifier 20. The adjusted signal is connected to the base electrode of a transistor 96 through a coupling capacitor 98, with the base electrode biased by resistors 100 and 102 connected, respectively, to a plus and minus supply voltage from the power supply 18.

The transistor 96 provides complementary outputs at terminals 104 and 106 connected, respectively, to the collector and emitter electrodes of the transistor. Resistors 108 and 110 establish the biasing current control levels for operation of the transistor 96.

By means of a switch 112 either polarity of the sync separator signal may be input to the receiver monitor. The signal at either the terminal 104 or the terminal 106 is applied through a coupling capacitor 114 to a peak-to-peak detector including diodes 116 and 118. The detected sync signal at the cathode of diode 118 charges capacitor 125 to the peak of the sync pulse. Resistor 120 and capacitor 126 form an integrated replica of the sync pulse that is connected to the noninverting input of voltage camparator 124.

Coupled to the peak-to-peak detector is a bias control including a capacitor in parallel with potentiometer 122 having a wiper arm connected to the inverting input terminal of a voltage comparator amplifier 124. The noninverting input terminal of the amplifier 124 is connected to the resistor 120 and to a capacitor 126, the latter connected to ground. This connection provides a self-adjusting threshold to the negative terminal of 124 for thresholding the pulse on the positive input. Functionally, the operational amplifier 124 serves as a limiter and generates an output voltage applied through a resistor 128 to a Zener diode 130. The resistor 128 and the Zener diode 130 provide the limiting function of the operational amplifier 124.

Figure 6:
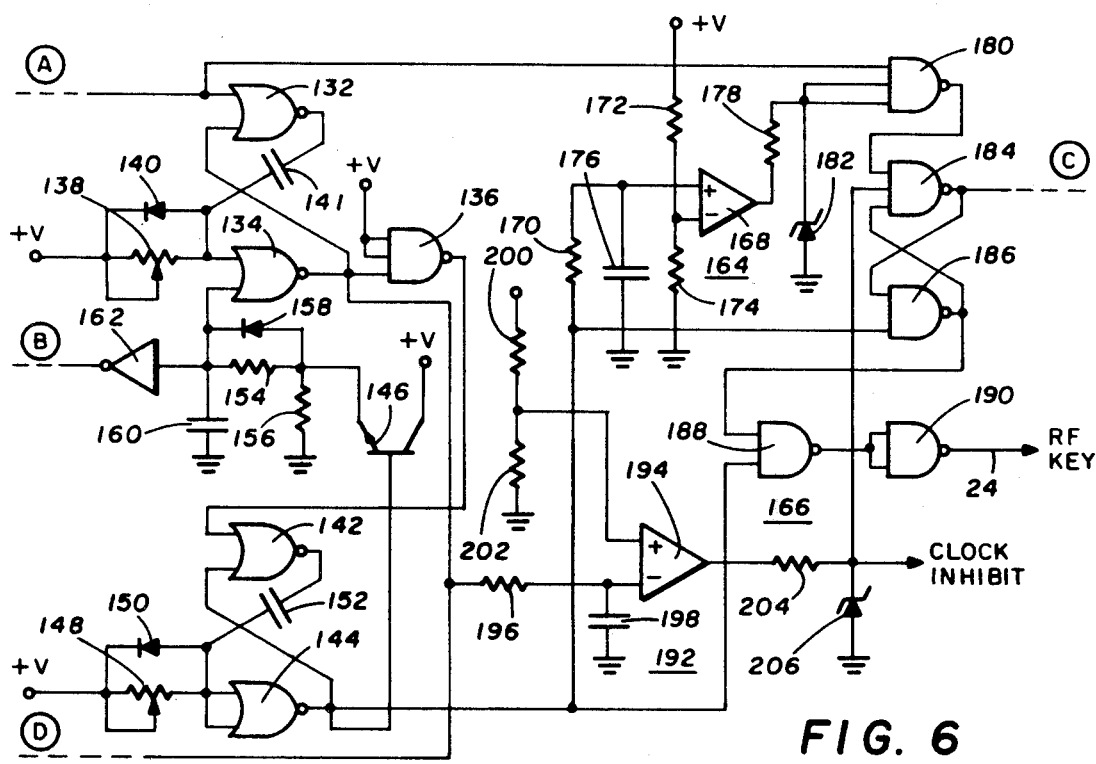
FIG. 6 is a logic schematic diagram of the pulse generator, noise detector, match recognizer, and RF keyer and continuous level control through the RF key of FIG. 1.

Referring to FIG. 6, there is shown a logic schematic of the controller 22 where the sync separator signal on line A, at the junction of the resistor 128 and the Zener diode 130, is applied to an OR gate 132 as one element of circuitry for the first pulse generator of the controller 22. This first pulse generator also includes an OR gate 134 connected as a logic latch with the OR gate 132 and having an output applied to a NAND gate 136. The timing function for the first pulse generator is provided by a variable resistor 138 in parallel with a diode 140, both interconnected to a capacitor 141.

A pulse trigger generated at the output of the NAND gate 136 is connected to an OR gate 142 as part of the second pulse generator of the controller 22. Also included in the second pulse generator is an OR gate 144 connected as a logic latch with the OR gate 142 and having an output connected to an inhibit transistor 146. The pulse length generated by the second pulse generator is controlled by a variable resistor 148 in parallel with a diode 150 and a capacitor 152.

By operation of the transistor 146, the first pulse generator is inhibited while the second pulse generator is high by a connection from the emitter electrode of the transistor to an input of the OR gate 134 through a timing circuit including resistors 154 and 156 and further including a diode 158 and a capacitor 160. The inhibit signal applied to the first pulse generator is also applied to an inverter amplifier 162.

A pulse trigger generated at the output of the OR gate 144 is also applied to match recognizer logic 164 and an RF key logic 166. The match recognizer logic includes an operational amplifier 168 having one input terminal connected through a resistor 170 to the OR gate 144 and a second input connected to a divider network comprising resistors 172 and 174. Also connected to the first input of the operational amplifier 168 is a capacitor 176.

An output voltage produced by the operational amplifier 168 is applied through a resistor 178 to a NAND gate 180 and a limiter consisting of a Zener diode 182. Also connected to the NAND gate 180 is the sync separator signal on line A, at the junction of the resistor 128 and the Zener diode 130. The output of the NAND gate 180 is coupled to a NAND gate 184 connected in a flip-flop configuration with a NAND gate 186. The second input to the NAND gate 186 is the output of the OR gate 144. The output of the NAND gate 184 is the match indication signal coupled to the precounter 30.

With regard to the RF keyer logic 166, a NAND gate 188 has one input coupled to the output of the NAND gate 186 and a second input from the OR gate 144. An output from the NAND gate 188 is coupled through a NAND gate 190 generating the RF key signal on the line 24 to the oscillators 26–29.

Also included in the controller 22 is clock inhibit logic 192 consisting of an operational amplifier 194 having an inverting input terminal connected to the output of the first pulse generator at the OR gate 134 through a resistor 196. A capacitor 198 is also coupled to the inverting input terminal of the operational amplifier 194. The noninverting input terminal of the amplifier 194 connects to a voltage divider network consisting of resistors 200 and 202. The output of the operational amplifier 194 is applied to a limiter including a resistor 204 connected to a Zener diode 206. The output of the amplifier interconnection of the resistor 204 and the Zener diode 206 is the clock inhibit signal and is applied to the NAND gate 184 to inhibit operation of the match recognizer.

In operation of the circuit of FIG. 6 for a match recognition, the second pulse generator produces an output at the OR gate 144 to enable the gate 180 through the time delay circuit including the operational amplifier 168. The time delay circuit 168 is configured to produce a delay that roughly matches the delay of the limiter at the output of the operational amplifier 124. Thus, the NAND gate 180 receives one input from the OR gate 144 via amplifier 168 and a second input from the limiter connected to the operational amplifier 124. Whenever an RF pulse received from the multichannel receiver 10 coincides with the firing of the second pulse generator, the NAND gate 180 generates a logic zero signal as an indication of match recognition.

Amplifier 194, whose operation will be explained shortly, produces a continuous logic one level when receiver 10 is producing sync pulses. If NAND gate 180 generates a logic zero level, gate 184 will feed a logic one level to gate 186 and to line C, which resets the precounter, and NAND gate 186 will generate a logic zero level, inhibiting gate 188. This operation causes the RF key at line 24 to return to a zero level, turning off the RF pulse, as soon as a match condition is received. When the second pulse generator turns off, the output of NOR gate 144 will go from a logic one to a zero level. This causes gate 186 to produce a one level. At this time, all three inputs of gate 184 will be at a one level, causing line C to return to a zero level. If no match has been received, the output of gate 184 will simply stay at a zero level, since the latch comprised of gates 184 and 186 would not have been triggered by gate 180.

The noise detector of the controller 22 includes the operational amplifier 194 as part of a slow speed integrator with the integration rate set by the resistor 196 and the capacitor 198. As described, the output of the operational amplifier 194 is coupled through a resistor 204 to the NAND gate 184.

When the receiver 10 is tuned to a channel receiving an input signal, a clear signal is received at the amplifier 20. The duty cycle of the first pulse generator at the output of the OR gate 134 is small enough such that for a clear signal the output of the operational amplifier 194 will be at a logic one level. If the noise content of the received signal is high, the first pulse generator is triggered at a rate much faster than the sync separator pulse rate, thereby increasing the duty cycle to a sufficiently fast rate to cause a logic zero signal to be generated at the output of the operational amplifier 194. This prevents the RF key logic 166 from being activated by the output of the NAND gate 186 connected to the NAND gate 188. Another function of the noise detector 192 is to inhibit the clocking of the data encoder 56.

Referring to FIG. 7, there is shown a block diagram of the precounter 30 consisting of interconnected stages of flip-flops 208–211, with the count terminal of the flip-flop 208 connected to receive pulse signals produced by the second pulse generator of the controller 22 at the output of the inverter amplifier 162 on the line B. This output of the amplifier 162 is also connected to a NAND gate 212.

Each time the output of the second pulse generator terminates, the output of the inverter amplifier 162 clocks the first precounter stage flip-flop 208 and applies a pulse to the NAND gate 212. When a match condition is identified by the match recognizer logic 164, the precounter is cleared by the output of the NAND gate 184 on the line C applied to the "S" terminal of the flip-flops 208–210. If the precounter 30 reaches a count of four, that is, if four consecutive pulses have been input to the flip-flop 208 without identifying a match condition, the output of the flip-flop 210 will enable the gate 212 and also clock the flip-flop 211.

Clocking the flip-flop 211 resets the seven stage counter 32 by the output at the $\overline{Q}$ terminal of the flip-flop 211 on line F. The next pulse from the first pulse generator at the output of the OR gate 134 on line D clears the fourth stage flip-flop 211 thereby releasing the seven stage counter into a count condition. Since the $\overline{Q}$ terminal of the third stage counter 210 is still in a logic one state the fourth stage flip-flop 211 cannot again be advanced thereby preventing the counter 32 from being reset. The gate 212 now remains enabled and the output on line E is applied to the seven stage counter 32 to enable the clocking of the counter.

When a channel match signal is generated at the output of the NAND gate 184 the first three stage flip-flops 208–210 are cleared thus inhibiting the gate 212 and stopping further clocking of the seven stage counter 32. Thus, under a channel match condition the output of the third stage flip-flop 210 is at a zero level which is the disabling level for the gate 212. The precounter 30 then recycles and each time the second pulse generator output terminates, the output of the inverter amplifier 162 again clocks the first stage flip-flop 208.

Referring to FIG. 8, with the gate 212 enabled each time a clocking pulse is generated it is applied to a count register 214 of the seven stage counter 32. The accumulated count in the count register 214 is an indication of the channel number of the multichannel receiver 10 and binary data representing this number appears on output lines 216 directly to the tuning matrix 58 and also through inverter amplifiers 218–222 to the tuning matrix. The last two output terminals of the count register 214 are applied over lines 224 to the decoder 292 to select one of the four possible steps in attenuator 25.

In operation of the seven stage counter 32, if the precounter 30 reaches a count of four, that is, if four consecutive pulses have been transmitted by the oscillators 26–29 without a match condition being received by the controller 22, the $\overline{Q}$ output of the flip-flop 210 changes to a logic one thereby enabling the gate 212 and clocking the fourth stage flip-flop 211 to cause the count register 214 to be reset by a connection over line F. The next clock pulse from the first pulse generator clears the fourth precounter stage releasing the count register 214 to start counting. Since the $\overline{Q}$ output of the third stage flip-flop 210 is still at a logic one level, the fourth stage flip-flop 211 cannot again reset the count register 214. At this time, the gate 212 is enabled allowing clock pulses to step the count register 214.

At the next occurrence of a match condition, the first three stage flip-flops 208–210 are cleared thereby inhibiting the gate 212 and stopping the further clocking of the counter 214. The count level now on the least significant line 216 in the counter 214 represents the channel tuned to be received by the multichannel receiver 10.

As explained, this count level is applied to the tuning matrix 58 and also the data encoder 56. With regard to the tuning matrix 58, the five bit channel code on the lines 216 is applied to a set of gates which decodes the channel number and generates, by way of switching transistors, an analog tuning voltage corresponding to the selected channel. This analog tuning voltage is applied to the voltage controlled oscillators 26–29 to establish the frequency of the injected pulse to the multichannel receiver 10.

Figure 9:
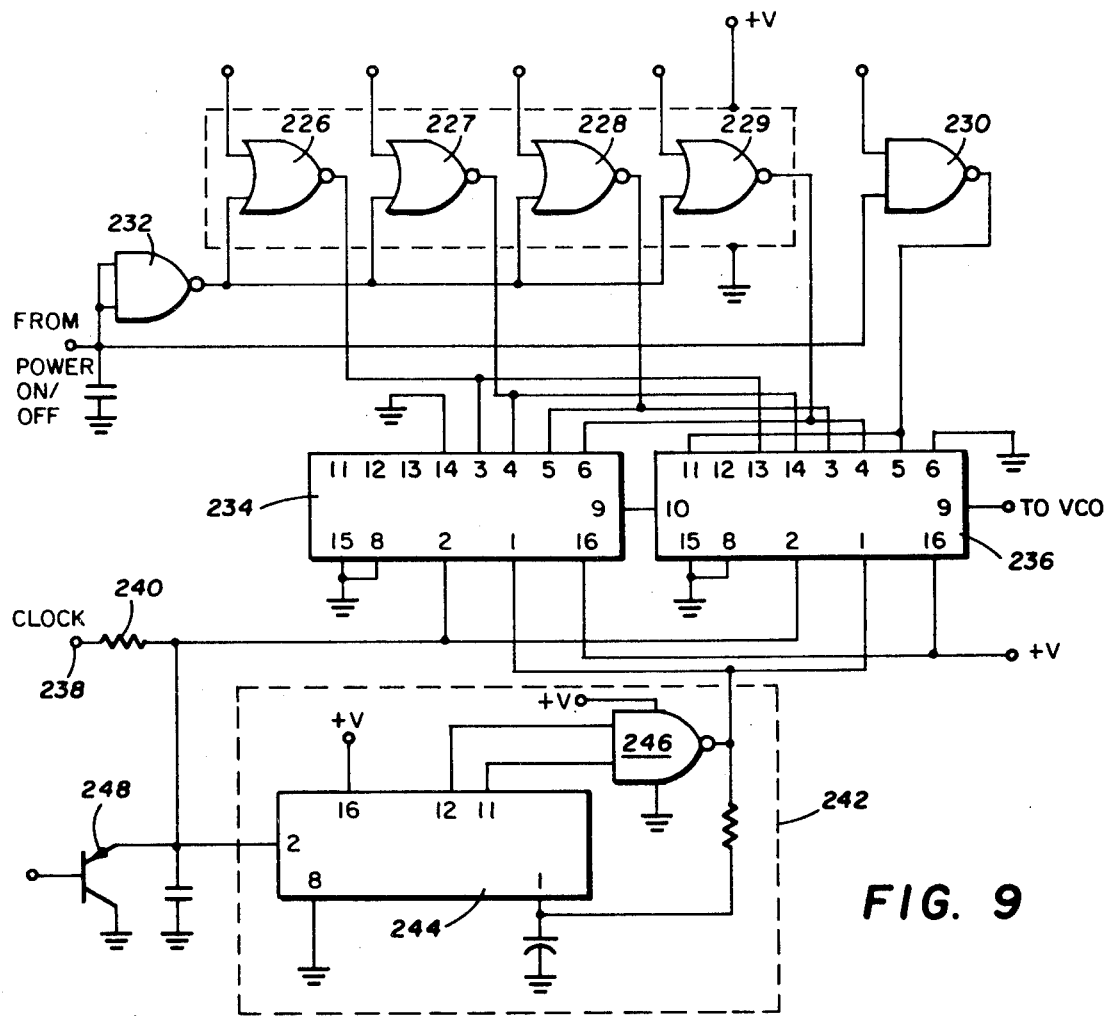
FIG. 9 is a logic schematic of the data encoder of FIG. 1 consisting of a set of gates feeding a parallel to serial shift register.

Referring to FIG. 9, there is shown a logic schematic of the data encoder 56 including input gates 226–230 receiving the five bit channel code on the lines 216. Each of the input gates 226–229 is also connected to the output of a NAND gate 232 that is enabled by a signal from the "power on" detector 62. If the receiver 10 is turned on, the digital state produced by the detector 62 will be a logic one thereby enabling the input gates 226–229 through the NAND gate 232 and enabling the input gate 230 directly from the output of the detector 62. When the receiver 10 is in an off state, the "power on" detector 62 produces a logic zero and the input gates 226–230 generate the code 00001.

Either the channel code applied to the input gates 226–230 when the receiver 10 is turned on or the power off code 00001 is applied to inputs of shift registers 234–236 which are clocked by clock pulses applied to a terminal 238 through a resistor 240.

Also included in the data encoder 56 is divide-by-twelve counter 242 consisting of a counter 244 connected through a NAND gate 246 to the shift registers 234 and 236. The divide-by-twelve counter 242 strobes the shift/load inputs of the shift registers 234 and 236 once for each twelve clock pulses applied to the register 244 thereby causing the shift registers to receive data from the input gates 226–230.

If no clock inhibit signal is applied to a transistor 248, the serial data from the shift register 236 is output to the voltage controlled oscillator 64. This data consists of a logic zero, followed by a five-bit channel code on the lines 216 as transmitted to the gates 226–230, followed by a logic one which in turn is followed by the same five-bit channel code. This output of the shift register 236 is applied to the voltage controlled oscillator 64 that generates an analog frequency signal through the amplifier 66 over the power line 72 or other communication links to the collector station of FIG. 4.

Figure 11:
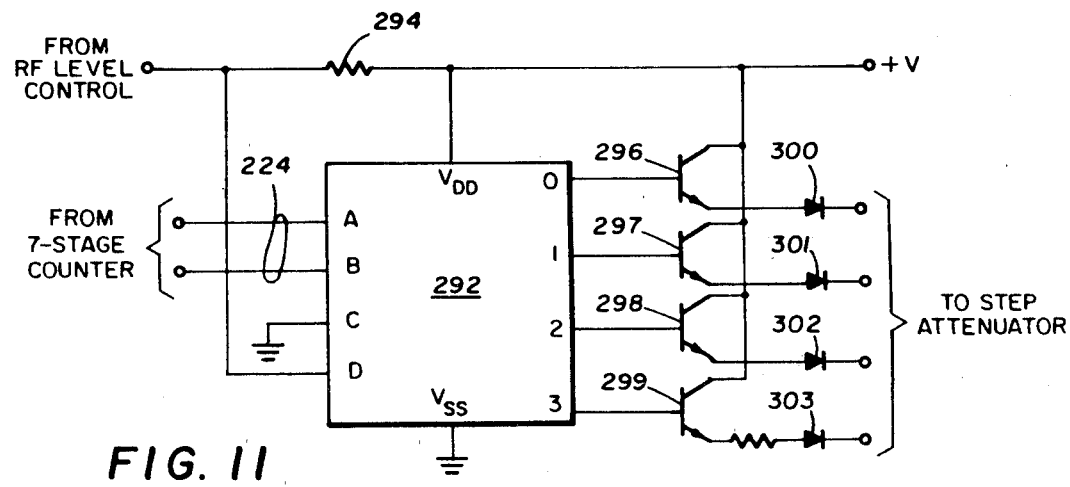
FIG. 11 is a schematic diagram of the step attenuator decoder of FIG. 1 controlled by the 7 stage counter of FIG. 1 for establishing the four discrete levels of frequency signal injected into the receiver.

Referring to FIGS. 10 and 11, there is shown schematic diagrams of the controller 22 for generating control signals to the attenuator 25. With reference to FIG. 10, this schematic details an RF level control that produces a variable bias voltage to vary the output level of the oscillators 26–29. While the precounter 30 and the seven stage counter 32 are searching for a channel match, the Q output of the flip-flop 210 is at a logic one level and this signal is applied to back-to-back transistors 256 and 258 having an interconnection to a holding capacitor 260. These transistors are biased by resistors 262 and 264 connected to a power supply. A logic one level at the Q terminal of the flip-flop 210 turns on the transistors 256 and 258 through resistors 266 and 268 to establish a charge on the capacitor 260 that represents a minimum attenuation factor applied by the attenuator. A more positive voltage on capacitor 260 increases the RF pulse amplitude.

As discussed previously, when a match signal is generated the output voltage at the $\overline{Q}$ terminal of the flip-flop 210 goes to a logic zero level which turns off the transistors 256 and 258. The attenuation level is now controlled by the feedback loops around an operational amplifier 270 having the noninverting input connected to the capacitor 260. Also connected to the noninverting input of the amplifier 270 is a timing resistor 272.

One feedback loop for the amplifier 270 includes a transistor 274 in series with a feedback resistor 276. The transistor 274 has a base drive established by a resistor 278 and a transistor 250. The transistor 250 is connected to receive the RF key signal on the line 24 and is biased by series resistors 252 and 254.

The transistor 250 is off when the RF key signal is on, where the pulse width of the RF key signal varies with the RF level at the receiver input. As explained previously, the RF key pulse is shorter under a match condition than it is when no match is received. The transistor 250 controls the conduction of the transistor 274 which is part of one feedback loop around the operational amplifier 270 and controls the charge established on the capacitor 260.

When a match signal is first generated the RF key pulse to the transistor 250 will usually be too strong, causing its width to be decreased. This causes the charge on the capacitor 260 to decay with the result of a reduction in a bias voltage applied to attenuator 25, FIG. 1. This produces a reduction in the level of the RF frequency pulse injected into the receiver 10 with the further result that the RF key pulse lengthens. This process is repeated until eventually there is an equilibrium state where the capacitor 260 retains a charge level necessary to hold a given amplitude for the RF frequency injected into the receiver 10. The output voltage of the operational amplifier 270 is applied through a resistor 280 and the attenuation factor of FIG. 11 rises and falls exponentially, unlike a simple RC network.

The second feedback loop is connected between the output of the operational amplifier 270 and the inverting input terminal. This loop overrides the step attenuator control if the amplitude of the injected frequency pulse to the receiver 10 is such that the feedback loop including the transistor 274, cannot satisfactorily attenuate the frequency pulse amplitude.

The second feedback loop for the operational amplifier 270 includes a transistor 282 having a base electrode connected through a resistor 284 to the output of the operational amplifier. Also connected to the output of the operational amplifier is a resistor 286 that connects directly to the inverting input terminal. The collector electrode of the transistor 282 is tied to the inverting terminal of the amplifier 270 through a resistor 288 and a resistor 290 also connects to the inverting input terminal. Resistors 286 and 290 control the gain of amplifier 270.

If the output voltage of the operational amplifier 270 decays to a level low enough to turn off the transistor 282, a positive voltage will be applied to the inverting input terminal of the amplifier thereby forcing the amplifier output to go negative. With a negative output from the amplifier 270, the output of the attenuator decoder of FIG. 11 turns off thereby setting the amplitude of the signal injected into the receiver 10 at a minimum level. This results in a loss of any channel match causing the precounter 30 and the seven stage counter 32 to recycle to search for a new channel and also resetting the circuitry for controlling the charge on the capacitor 260.

Referring to FIG. 11, the collector electrode of the transistor 282 is connected to a decoder 292 also receiving signals from the counter register 214 over the lines 224. The voltage developed at the collector electrode of the transistor 282 is generated at a resistor 294 connected to a positive supply that also connects to the decoder 292. This positive supply is also tied to the collector electrodes of switching transistors 296–299 that are controlled by the decoder 292. Each of these switching transistors has an emitter electrode connection to one of the diodes 300–303, respectively, which are individually connected to the attenuator 25. The step attenuator 25 is thus controlled by the attenuation code generated at the transistors 296–299.

Figure 12:
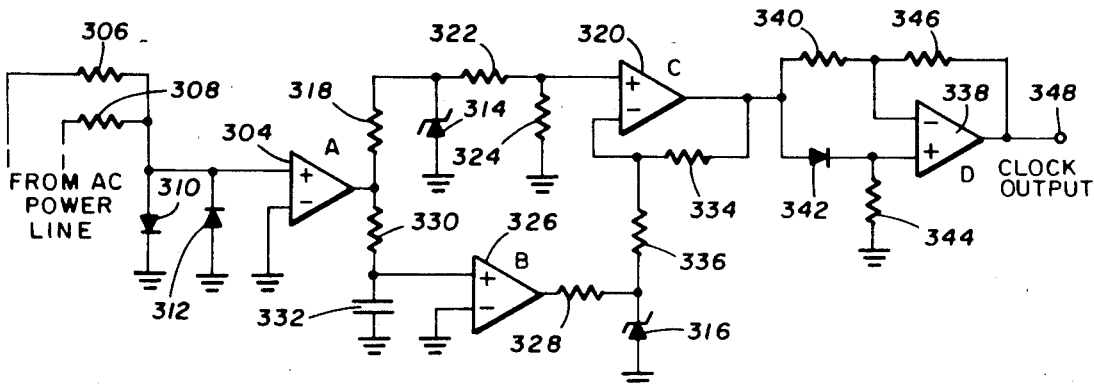
FIG. 12 is a schematic diagram of the clock generator of FIG. 1.

Referring to FIG. 12, operation of the multichannel receiver monitor of FIG. 1 is timed by clock pulses generated by the clock 60, as schematically illustrated, and includes an operational amplifier 304 having a noninverting input terminal connected to an AC power line through resistors 306 and 308. The input circuit to the amplifier 304 includes limiting diodes 310 and 312. A voltage generated at the output of the amplifier 304 is a square wave appearing across Zener diodes 314 and 316. Connected between the output of the amplifier 304 and the Zener diode 314 is a current limiting resistor 318. The square wave appearing across the Zener diode 314 is applied to an operational amplifier 320 through an input circuit consisting of resistors 322 and 324. The square wave appearing across the Zener diode 316 is generated at the output of an operational amplifier 326 through a current limiting resistor 328. At the input to the amplifier 326 there is a time lag circuit consisting of a resistor 330 in series with a capacitor 332.

Due to the time delay caused by the time lag circuit of the resistor 330 and the capacitor 332, the phase of the waveform across the Zener 316 lags the phase of the waveform produced across the Zener diode 314. These two waveforms are combined at the output of the operational amplifier 320 that has a feedback loop consisting of a resistor 334 connected to the Zener diode 316 through a resistor 336. By operation of the feedback resistor 334, equal level waveforms are generated at the output of the amplifier 320 by inputs from the diodes 314 and 316. Due to the time and polarity characteristics between the outputs of the amplifiers 304 and 326, the voltage produced at the output of amplifier 320 will vary in discrete pulses.

Output pulses from the operational amplifier 320 are input to an operational amplifier 338 through an input resistor 340 and a diode 342. Also connected to the amplifier 338 is a bias resistor 344, and a feedback loop for the operational amplifier includes a resistor 346. The operational amplifier 338 produces a rectified output at a terminal 348 alternating between positive and zero, and producing one clock pulse each time the AC power line voltage passes through the zero crossing axis. These clock pulses, as explained, control the operation of the monitor of FIG. 1.

Referring of FIG. 13, there is shown a logic schematic of the collector station of FIG. 4 including the shift register logic 78, the digital comparator 86, and the "01" recognizer 88. Clock signals from the clock generator 76 are gated through an EXCLUSIVE OR gate 350 to OR gate 352 and 354, with the OR gate 354 connected to the clock terminals of shift registers 356 and 358. Serial channel code data from the demodulator 80 is input to the shift register 358 where it is converted into a parallel format.

To reset shift registers 358 and 356, a strobe pulse from the operation controller 70 is applied to a NOR gate 360 of a flip-flop including a NOR gate 362. The output of the NAND gate 360 is applied through a gate 364 to the reset terminal of the shift registers 356 and 358. The trailing edge of the next clock pulse removes the reset pulse from the shift registers 356 and 358 thereby allowing these registers to begin receiving data. After seven clock periods have elapsed, the output lines of the shift registers 358 contain signals that represent valid channel code data from a receiver monitor.

At this time, an output on the line 366 from the shift register 356 steps to a logic one level and NOR gate 368 is inhibited allowing gate 352 to stop clocking the shift registers when it is inhibited. This condition exists when a correct data sequence has been located. The identification of a correct data sequence is the function of a gate 370 having inputs connected to the shift register 358 and an output tied to the OR gate 352. When the output of the gate 370 steps to a logic one level, the logic levels on the first and seventh outputs of the shift register 358 are in opposite states, identified as synchronizing bits, between which the five bit channel code data exists.

Channel code data from the shift register 358 is input to the digital comparator 368 comprising gates 372–376, which are also connected to receive channel code data from the operations controller 70. The output of each of the gates 372–375 is applied to the input of a NAND gate 378 having an output connected to a gate 380. Also connected to an input of the gate 380 is the output of the gate 376. When the channel code data from the shift register 358 equals the inverse of the channel code data transmitted from the operations controller 70, a logic one is generated at the output of the gate 380 to indicate a match condition. This match signal is stored in the controller 70 as an indication that the receiver 10 was tuned to the channel identified by the code data supplied by the operations controller 70.

Four of the output lines from the shift register 358 are connected to a NAND gate 382 as part of the "01" recognizer 88. An output from the NAND gate 382 is applied to diode logic including diodes 384 and 386, with the latter connected to a fifth output of the shift register 358. These diodes are interconnected to a resistor 388.

The "01" recognizer produces a logic zero at the cathode of the diodes 384 and 386 if the channel code 11110 (the inverse of 00001) is input to the NAND gate 382 and connected to the anode of the diode 386.

Figure 14:
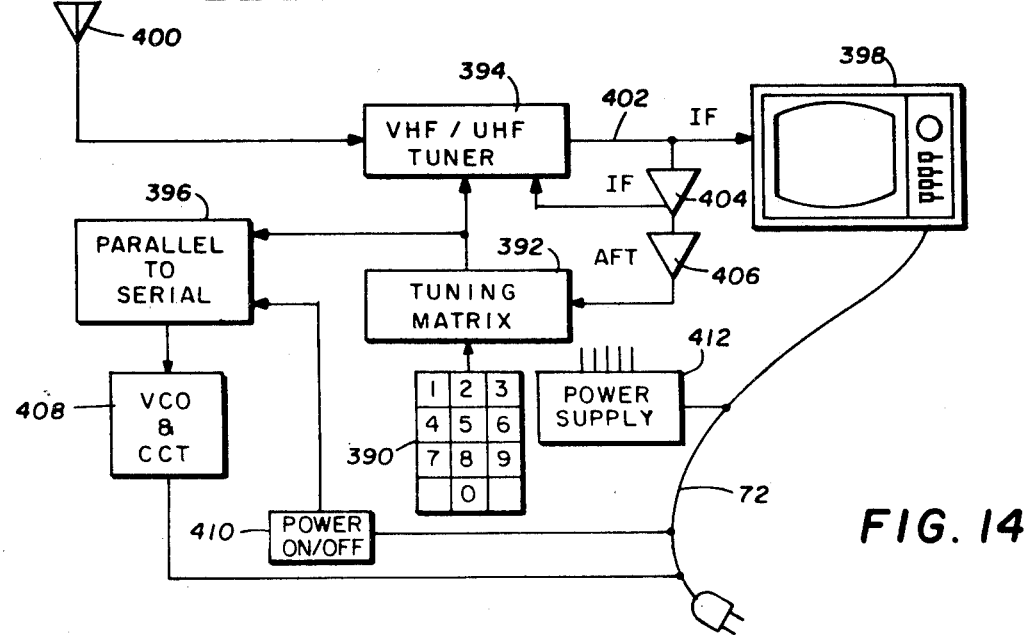
FIG. 14 is a block diagram of an alternate embodiment of the invention using a shaft encoding technique for generating channel identifying information.

Referring to FIG. 14, there is shown an alternate embodiment of the invention wherein a channel selector switch 390, which may be any one of several different designs, inputs signals to a tuning matrix 392. The tuning matrix 392 may be similar to the tuning matrix 58 of the system of FIG. 1.

Channel data generated at the output of the tuning matrix 392 is input to a VHR/UHF tuner 394 and also to a parallel-to-serial data encoder 396. The tuner 394 is of a conventional design and may be an integral part of a multichannel receiver 398. Channel signals selected by the tuner 394 are received on an antenna 400 and input to the receiver 398 over a line 402. IF signals from the tuner 394 on the line 402 are also input to an IF amplifier 404 generating signals applied to an amplifier 406 connected in a feedback loop to the tuning matrix 392.

Channel code data at the output of the tuning matrix 392, as input to the parallel-to-serial converter 396, is applied to the input of a voltage controlled oscillator 408 having an output feeding a carrier current transmitter for applying channel code data to the power line 72. Also connected to the parallel-to-serial converter 396 is a "power on" detector 410 similar in construction and operation to the "power on" detector 62 of FIG. 1.

With reference to FIG. 14, the parallel-to-serial encoder 396, the voltage controlled oscillator and carrier current transmitter 408 and the "power on" detector 410 are similar to and function in the same manner as similar components of the embodiment of FIG. 1. Also, a power supply 412 may be of the type utilized in the embodiment of FIG. 1. This power supply provides voltage levels to various components of the monitor of FIG. 14.

A signal representing channel code data applied to the power line 72 is input to the collector station of FIG. 4 in the same manner as data output from the amplifier 66 of the embodiment of FIG. 1. The collector station of FIG. 4 stores data representing channels tuned to the receiver 398 for future evaluation.

Figure 15A:
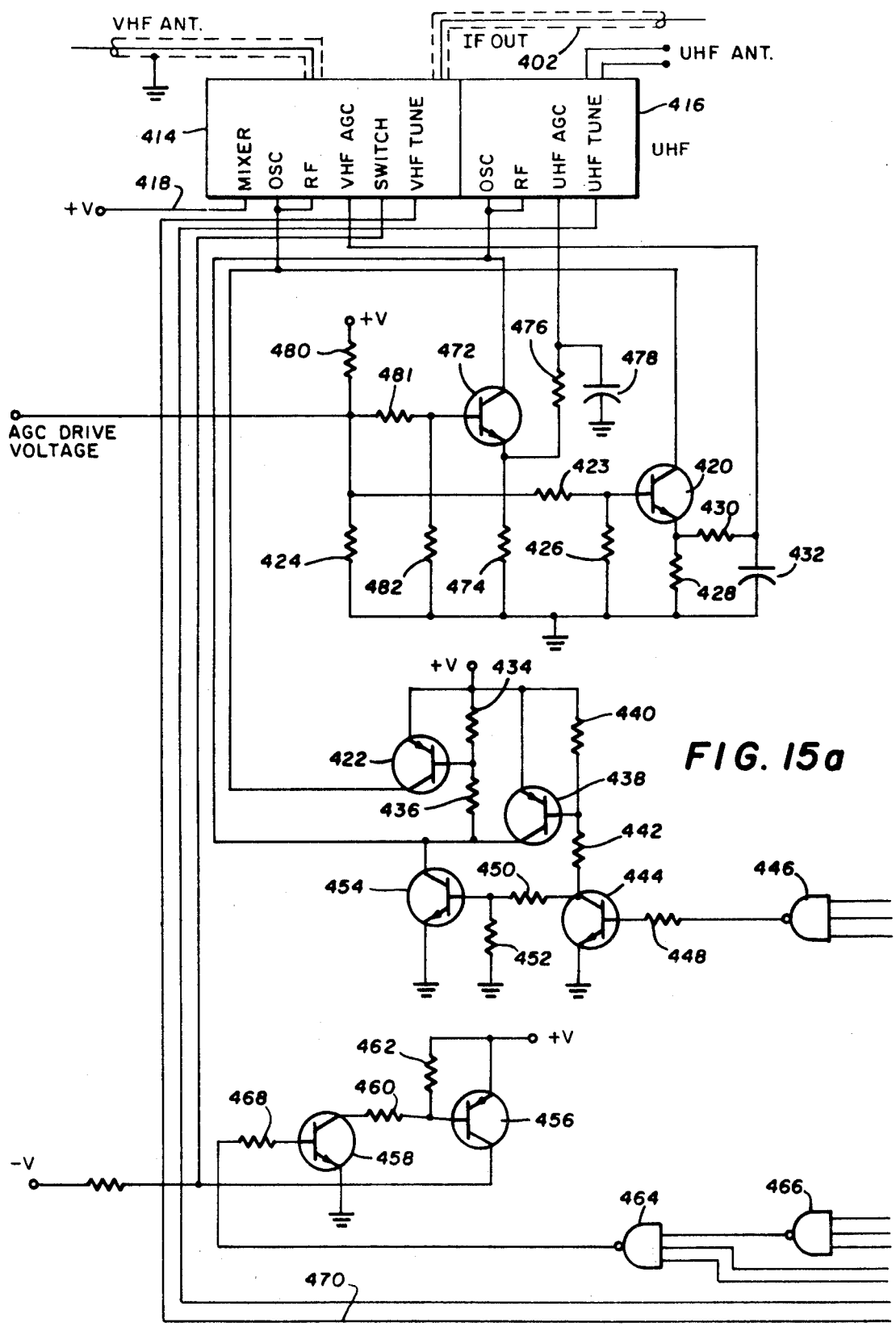

Referring to FIGS. 15a and 15b, there is schematically illustrated an embodiment of the tuning matrix 392 and the tuner 394 wherein VHF signals from the antenna 400 are input to a standard voltage controlled receiver tuner circuitry 414 and UHF signals are input to standard VHF tuner circuitry 416 IF signals from the circuits 414 and 416 are transmitted over the line 402 to the receiver 398.

Power for both the VHF and UHF mixers is input to the tuner 414 over a line 418; this is a standard mixer circuit as found in conventional multichannel receivers. Power for the UHF and RF amplifiers is input to the circuit 414 from the collector electrode of a transistor 422. The transistor 420 is connected to the AGC drive voltage from the IF amplifier 404 through a base resistor 423. Also forming a part of the drive circuit for the transistor 420 are resistors 424 and 426. A VHF/AGC drive voltage for the circuit 414 is generated at the emitter electrode of the transistor 420 by a network including resistors 428, 430 and a capacitor 432.

The oscillator and RF power voltages to the circuit 414 are switched by the transistor 422 having a base drive generated across resistors 434 and 436, the latter connected to the collector electrode of a transistor 438. The transistor 438 is in turn controlled by a voltage established at the interconnection of resistors 440 and 442 from the collector electrode of a transistor 444. The transistor 444 is driven by the output of a NAND gate 446, connected to the tuning matrix 392, through a base drive resistor 448. Transistor 442 is on and driven into saturation when one of the VHF channels is selected.

Also connected to the collector electrode of the transistor 444 is a base drive circuit, consisting of resistors 450 and 452, for driving a transistor 454 having a collector electrode tied to the collector electrode of the transistor 438. The transistor 454 controls the base drive of transistor 422 into saturation thus powering the oscillator and RF sections of the circuit 414 while insuring that power to the UHF section 416 is removed when the VHF is on by the clamping action of transistor 454.

A switching signal is provided to the circuit 414 at the output of a transistor 456 controlled by the collector voltage of a transistor 458 through a base drive circuit including resistors 460 and 462. The transistor 458 is controlled by the voltage level at the output of a NAND gate 464 connected to receive tuner control bits from the matrix 392. The NAND gate 464 also receives input pulses from a NAND gate 466 that has inputs tied to the tuning matrix of FIG. 15b. The output of the NAND gate 464 drives the transistor 458 through a base drive resistor 468.

A VHF tuning voltage is input to the circuit 414 over a line 470 connected to the tuning matrix of FIG. 15b.

With reference to the circuit 416, a transistor 472 controls the UHF/AGC voltage generated at the emitter electrode of this transistor. The emitter electrode is tied to a network including resistors 474, 476 and a capacitor 478. The transistor 472 is driven by the AGC drive voltage from the receiver 398 through a base drive circuit including resistors 480–482.

With reference to FIG. 15b, a five-bit channel code from the channel select switch 390 is applied to a matrix including NAND gates 484 and NOR gates 486. These gates decode the channel number selected and generate, by means of transistors 488, the UHF tuning voltage to the circuit 416 and, by means of transistors 490, the VHF tuning voltage to the circuit 414. Individual potentiometers 492 are connected to each of the transistors 488 to provide adjustment of the UHF tuning voltage for a selected channel. Similarly, individual potentiometers 494 are connected to the transistors 490 to provide adjustment of the VHF tuning voltage for a selected channel. The decoders also determine whether a UHF or VHF channel is selected, and if a VHF channel has bene selected, whether the channel is in the high band or low band. This information is input to the tuner of FIG. 15a as control of the circuits 414 and 416.

While several embodiments of the invention, together with modifications thereof, have been described in detail herein and shown in the accompanying drawings, it will be evident that various further modifications are possible without departing from the scope of the invention.

What is claimed is:

1. A method of monitoring the operation of a multichannel television receiver comprising the steps of:
  (a) injecting a signal into the input of the television receiver in synchronism with the television signal being received by the television receiver on the channel to which the television receiver is tuned;
  (b) varying the frequency of the injected signal among frequencies unique for each channel of the television receiver;
  (c) detecting the presence of an injected signal at the output of the television receiver to thereby provide an indication of a predetermined relationship between the frequency of the injected signal and the frequency of the television signal to which the television receiver is tuned and thus the channel to which the television receiver is tuned; and
  (d) storing data related to the channel to which the television receiver is tuned for subsequent transmission to a location remote from the television receiver.

2. The method of claim 1 wherein the signal is injected without radiation from the antenna of the television receiver.

3. The method of claim 2 wherein radiation is prevented by a unidirectional coupler.

4. The method of claim 2 wherein the injected signal is injected at a place in the television signal where the injected signal cannot be seen even if the amplitude thereof is greater than the amplitude of the video signal being received.

5. The method of claim 1 wherein the frequency of the injected signal is varied by selection of one of a plurality of oscillators each having an output signal unique to one channel of the television receiver.

6. The method of claim 1 wherein the amplitude of the signal injected is adjustable.

7. The method of claim 6 wherein the adjustment of the amplitude of the injected signal is automatic.

8. The method of claim 1 wherein the injected signal is synchronized by a signal related to the sync drive signals of the television receiver at a time when the television receiver is synchronized to the television signal being received.

9. The method of claim 8 wherein the injected signal is synchronized by a signal derived from the television signal being received.

10. The method of claim 1 wherein the injected signal is injected in a predetermined relationship to the horizontal and vertical blanking pulses of the television signal being received by the television receiver.

11. The method of claim 10 wherein the predetermined relationship is at a place in the television signal where the injected signal cannot be seen even if the amplitude thereof is greater than the amplitude of the video signal being received.

12. A method of monitoring the operation of a multichannel television receiver comprising the steps of:
(a) providing a first signal related in frequency to the frequency of a first one of the channels of the television receiver being monitored;
(b) injecting the first signal into the tuner of a television receiver in synchronism with the television signal being received by the television receiver on the channel to which the television receiver is tuned;
(c) detecting the failure of the tuner of the television receiver to pass the first signal to thereby indicate that the frequency of the first injected signal is improperly related to the television signal to which the television receiver is tuned;
(d) providing a second signal related in frequency to the frequency of a second one of the channels of the television receiver being monitored;
(e) injecting the second signal into the tuner of the television receiver in synchronism with the television signal being received by the television receiver on the channel to which the television receiver is tuned;
(f) detecting the passage of the second injected signal by the tuner of the television receiver to thereby indicate that the frequency of the second signal is properly related to the frequency of the television signal to which the television receiver is tuned; and
(g) storing data related to time and to the frequency of the second signal and thus the channel to which the television receiver is tuned for subsequent transmission to a location remote from the television receiver.

13. The method of claim 12 wherein the data stored is stored in a collector unit electrically connected to, but remote from, the television receiver;
and including the further step of transmitting the stored data from the collector unit to a remote location over telephone lines under control of apparatus at the remote location.

14. The method of claim 12 including the steps of:
(h) injecting the second signal into the tuner of the television set in synchronism with the television signal being received by the television receiver on the channel to which the television receiver is tuned a predetermined time after the first detection of the passage of the second injected signal by the tuner; and
(i) detecting the failure or success of the tuner of the television receiver in passing the second signal at the second injection to thereby indicate the validity of the detection of the passage of the second signal at the first injection thereof.

15. The method of claim 12 wherein synchronism of the injected signal with the television signal to which the television receiver is tuned is established by detecting the horizontal and vertical blanking pulses in the video signal and injecting the first and second signals responsively to the detection at a place in the video signal where the injected signal cannot be seen by the television viewer notwithstanding an amplitude greater than that of the video signal.

16. A system for monitoring the operation of a multichannel television receiver comprising:
means for injecting a signal into the input of the television receiver in synchronism with the television signal being received by the television receiver on the channel to which the television receiver is tuned;
means for varying the frequency of the injected signal among frequencies unique for each channel of the television receiver;
means for detecting the presence of the injected signal at the output of the television receiver to thereby provide an indication of a predetermined relationship between the frequency of the injected signal and the frequency of the television signal to which the television receiver is tuned and thus the channel to which the television receiver is tuned; and
means for storing data related to the channel to which the television receiver is tuned for subsequent transmission to a location remote from the television receiver.

17. The system of claim 16 wherein said signal injecting means includes means for preventing radiation of the injected signal from the antenna of the television receiver.

18. The system of claim 17 wherein said radiation preventing means includes a unidirectional coupler.

19. The system of claim 16 wherein said means for varying the frequency of the injected signal includes a plurality of oscillators each having an output signal unique to one channel of the television receiver.

20. The system of claim 16 wherein said signal injecting means includes means for adjusting the amplitude of the injected signal.

21. The system of claim 20 wherein said amplitude adjusting means is automatic.

22. The system of claim 16 wherein said signal injecting means includes means for deriving a synchronization signal synchronously related to the sync drive signals of the television receiver at a time when the television receiver is synchronized to the television signal being received.

23. The system of claim 22 wherein said synchronization signal is derived from the television signal being received.

24. The system of claim 16 wherein said signal injecting means includes means for injecting the signal in a predetermined relationship to the horizontal and vertical blanking pulses of the video signal being received by the television receiver.

25. The system of claim 24 wherein said predetermined relationship is at a place in the video signal where the injected signal cannot be seen even if the amplitude thereof is greater than the amplitude of the video signal being received.

26. The system of claim 16 wherein said signal injecting means includes means for injecting the signal at a place in the received television signal where the injected signal cannot be seen even if the amplitude thereof is greater than the amplitude of the video signal being received.

27. A system for monitoring the operation of a multichannel television receiver comprising:
means for providing an injection signal selectively related in frequency to each channel of the television receiver;

means responsive to the horizontal and vertical blanking pulses of the video signal of the television receiver for synchronizing the injection of said injection signal to thereby avoid detection of the injected signal by a television viewer;

means for injecting said injection signal into the tuner of the television receiver;

means for detecting the passage (or failure to pass) of said injection signal by the tuner of the television receiver to thereby provide an indication of a predetermined relationship (or lack thereof) between the frequency of said injected signal and the frequency of the television signal to which the television receiver is tuned; and collector means remote from the television receiver responsive to said detecting means for recording data related to time and results of the detection; and means for transmitting said data to a location remote from said collector means.

28. A system for monitoring the operation of a multi-channel television receiver for the purpose of deriving data relating to the viewing habits of the television audience comprising:

means for detecting the on/off status of the television receiver;

means for injecting a signal into the input of the television receiver in synchronism with the television signal being received by the television receiver on the channel to which the television receiver is tuned, said means including:

means for preventing radiation of the injected signal from the antenna of the television receiver, means for deriving a synchronization signal synchronously related to the sync drive signals of the television receiver at a time when the television receiver is synchronized to the television signal being received, means for injecting the signal in a predetermined relationship to the horizontal and vertical blanking pulses of the video signal being received by the television receiver, said predetermined relationship being at a place in the television signal where the injected signal cannot be seen even if the amplitude thereof is greater than the amplitude of the video signal being received, and means for varying the frequency of the injected signal among frequencies unique for each channel of the television receiver, said means including a plurality of oscillators each having an output signal unique to one channel of the television receiver;

means for detecting the presence of the injected signal at the output of the television receiver to thereby provide an indication of a predetermined relationship between the frequency of the injected signal and the frequency of the television signal to which the television receiver is tuned and thus the channel to which the television receiver is tuned;

clock means; and means for storing data related to time, the on/off status of the television receiver and the channel to which the television receiver is tuned for subsequent transmission to a location remote from the television receiver.

29. A method of monitoring the operation of a multi-channel television receiver for the purpose of deriving data relating to the viewing habits of a television audience comprising the steps of:

(a) injecting a signal into the input of the television receiver in synchronism with the television signal being received by the television receiver on the channel to which the television receiver is tuned while preventing radiation of the injected signal from the antenna of the television receiver;

(b) deriving a synchronization signal synchronously related to the sync drive signals of the television receiver at a time when the television receiver is synchronized to the television signal being received;

(c) injecting the signal in a predetermined relationship to the horizontal and vertical blanking pulses of the video signal being received by the television receiver, the predetermined relationship being at a place in the video signal where the injected signal cannot be seen even if the amplitude thereof is greater than the amplitude of the video signal being received;

(d) varying the frequency of the injected signal among frequencies unique for each channel of the television receiver by selecting one of a plurality of oscillators each having an output signal unique to one channel of the television receiver;

(e) detecting the presence of the injected signal at the output of the television receiver to thereby provide an indication of a predetermined relationship between the frequency of the injected signal and the frequency of the television signal to which the television receiver is tuned and thus the channel to which the television receiver is tuned;

(f) providing a clock signal; and (g) storing data related to time, the on/off condition of the television receiver and the channel to which the television receiver is tuned for subsequent transmission to a location remote from the television receiver.

30. The method of claim 29 including the further step of transmitting the stored data to a remote location via telephone lines under control of equipment at the remote location.

31. The method of claim 29 wherein the amplitude and frequency of each of the injected signals is substantially constant.

* * * * *